(12) United States Patent
Lee

(10) Patent No.: US 12,517,329 B2
(45) Date of Patent: Jan. 6, 2026

(54) OPTICAL IMAGING SYSTEM

(71) Applicant: SAMSUNG ELECTRO-MECHANICS CO., LTD., Suwon-si (KR)

(72) Inventor: Tae Youn Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/543,741

(22) Filed: Dec. 18, 2023

(65) Prior Publication Data

US 2024/0126049 A1 Apr. 18, 2024

Related U.S. Application Data

(63) Continuation of application No. 17/881,014, filed on Aug. 4, 2022, now Pat. No. 11,885,941, which is a continuation of application No. 16/779,998, filed on Feb. 3, 2020, now Pat. No. 11,442,252, which is a continuation of application No. 16/040,820, filed on Jul. 20, 2018, now Pat. No. 10,591,703, which is a continuation of application No. 15/190,654, filed on Jun. 23, 2016, now Pat. No. 10,054,768.

(30) Foreign Application Priority Data

Dec. 28, 2015 (KR) .................. 10-2015-0187172

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ............................ G02B 13/0045; G02B 9/62
USPC .................................. 359/713, 752, 756, 761
See application file for complete search history.

(56) References Cited

U.S. PATENT DOCUMENTS

| 8,736,979 B2 | 5/2014 | Tsai et al. |
| 9,201,216 B2 | 12/2015 | Huang et al. |
| 9,952,404 B2 | 4/2018 | Son |

(Continued)

FOREIGN PATENT DOCUMENTS

| CN | 203981955 U | 12/2014 |
| CN | 204389773 U | 6/2015 |

(Continued)

OTHER PUBLICATIONS

Korean Office Action issued on Jun. 19, 2017 in counterpart Korean Application No. 10-2015-0187172 (9 pages in English; 6 pages in Korean).

(Continued)

*Primary Examiner* — William Choi
(74) *Attorney, Agent, or Firm* — NSIP Law

(57) ABSTRACT

An optical imaging system includes a first lens including a negative refractive power and a convex object-side surface, and a second lens including a convex object-side surface and a convex image-side surface. The optical imaging system also includes a third lens including a negative refractive power and a convex object-side surface, a fourth lens including a convex image-side surface, a fifth lens, and a sixth lens including an inflection point formed on an image-side surface thereof. The first to sixth lenses are sequentially disposed in an optical-axis direction.

16 Claims, 12 Drawing Sheets

(56) References Cited

U.S. PATENT DOCUMENTS

| | | |
|---|---|---|
| 10,054,768 B2 | 8/2018 | Lee |
| 10,591,703 B2 | 3/2020 | Lee |
| 11,442,252 B2 | 9/2022 | Lee |
| 2014/0092491 A1 | 4/2014 | Hsu et al. |
| 2014/0153117 A1* | 6/2014 | Hagiwara .......... G02B 13/0045 359/757 |
| 2014/0184895 A1 | 7/2014 | Ahn et al. |
| 2014/0376107 A1 | 12/2014 | Son |
| 2015/0022905 A1 | 1/2015 | Shinohara et al. |
| 2015/0116573 A1 | 4/2015 | Liao |
| 2015/0124332 A1 | 5/2015 | Noda et al. |
| 2015/0131168 A1 | 5/2015 | Asami |
| 2015/0177490 A1 | 6/2015 | Cho et al. |
| 2015/0212296 A1 | 7/2015 | Huang et al. |
| 2015/0277083 A1 | 10/2015 | Chae |
| 2016/0004046 A1 | 1/2016 | Asami |
| 2016/0124184 A1* | 5/2016 | Tang ................ G02B 9/62 359/713 |
| 2016/0161719 A1 | 6/2016 | Son |
| 2016/0252709 A1 | 9/2016 | Lin et al. |
| 2016/0259150 A1 | 9/2016 | Shin et al. |
| 2016/0341935 A1 | 11/2016 | Chen et al. |
| 2017/0045718 A1 | 2/2017 | Park |

FOREIGN PATENT DOCUMENTS

| | | |
|---|---|---|
| CN | 204556941 U | 8/2015 |
| CN | 104950424 A | 9/2015 |
| CN | 105143948 A | 12/2015 |
| CN | 204883028 U | 12/2015 |
| CN | 105676419 A | 6/2016 |
| CN | 106033414 A | 10/2016 |
| CN | 106443961 A | 2/2017 |
| JP | 2013-73163 A | 4/2013 |
| JP | 2014-44250 A | 3/2014 |
| JP | 2015-22145 A | 2/2015 |
| KR | 10-2014-0089007 A | 7/2014 |
| KR | 10-2015-0000712 A | 1/2015 |
| KR | 10-2016-0108080 A | 9/2016 |

OTHER PUBLICATIONS

Chinese Office Action issued on Sep. 29, 2018 in corresponding Chinese Patent Application No. 201610534978.5 (9 pages in English and 6 pages in Chinese).

Chinese Office Action issued on May 28, 2019 in corresponding Chinese Patent Application No. 201610534978.5 (10 pages in English and 8 pages in Chinese).

Chinese Office Action issued on Jan. 6, 2022, in counterpart Chinese Patent Application No. 202010093042.X (8 pages in English and 8 pages in Chinese).

Chinese Office Action issued on Apr. 27, 2021, in counterpart Chinese Patent Application No. 202010093042.X (5 pages in English and 7 pages in Chinese).

U.S. Appl. No. 17/881,014, filed Aug.4, 2022, Tae Youn Lee, Samsung ELectro-Mechanics Col, Ltd.

* cited by examiner

| FIRST EMBODIMENT | | | | | | |
|---|---|---|---|---|---|---|
| f = | 2.999 | Θ = | 45.08 | TTL = | 4.3650 | |
| SURFACE NO. | | RADIUS OF CURVATURE | THICKNESS /DISTANCE | REFRACTIVE INDEX | ABBE NUMBER | FOCAL LENGTH |
| S1 | FIRST LENS | 5.9600 | 0.2300 | 1.650 | 21.5 | -106.530 |
| S2 | | 5.4100 | 0.0480 | | | |
| S3 | SECOND LENS | 3.9200 | 0.6370 | 1.544 | 56.1 | 2.520 |
| S4 | | -2.0000 | 0.0300 | | | |
| S5 | THIRD LENS | 2.4300 | 0.2590 | 1.650 | 21.5 | -6.090 |
| S6 | | 1.4500 | 0.5310 | | | |
| S7 | FOURTH LENS | -3.1400 | 0.7520 | 1.544 | 56.1 | 4.060 |
| S8 | | -1.4100 | 0.0300 | | | |
| S9 | FIFTH LENS | 7.0500 | 0.3250 | 1.544 | 56.1 | 3.420 |
| S10 | | -2.5000 | 0.0650 | | | |
| S11 | SIX LENS | 16.6800 | 0.4000 | 1.535 | 55.7 | -1.620 |
| S12 | | 0.8200 | 0.3300 | | | |
| S13 | FILTER | infinity | 0.1100 | 1.517 | 64.2 | |
| S14 | | infinity | 0.6180 | | | |
| S15 | IMAGING PLANE | infinity | | | | |

FIG. 3

| ASPHERICAL COEFFICIENT | | | | | | | | |
|---|---|---|---|---|---|---|---|---|
| SURFACE NO. | K | A | B | C | D | E | F | G | H |
| S1 | -75.09401 | -1.21130E-01 | 4.39606E-01 | -3.30554E-01 | 1.36024E+01 | -3.01051E-01 | 3.46486E+01 | -1.63130E+01 | |
| S2 | -53.02762 | -9.37283E-02 | -2.21925E-02 | 7.05754E-01 | 1.34456E+00 | -6.50892E+00 | 8.87780E+00 | -4.27420E+00 | |
| S3 | -45.35109 | 5.20512E-02 | -4.85841E-01 | 1.20071E-01 | -4.45882E-01 | -2.49203E-01 | 3.96794E+00 | -1.85161E+00 | |
| S4 | 2.17398 | 8.03117E-02 | -5.37386E-01 | 1.57894E+00 | -2.49067E+00 | 2.21253E+00 | -1.03782E+00 | 1.99970E-01 | |
| S5 | -7.96133 | -1.77257E-02 | 5.24897E-02 | 1.56305E-01 | -2.14293E+00 | 1.59731E+00 | -5.94484E-01 | 8.15403E-02 | |
| S6 | -3.42311 | -1.46414E-02 | -1.89034E-02 | 3.91978E-01 | -2.30121E-01 | -1.34151E-01 | 2.16031E-01 | -6.91246E-02 | |
| S7 | -14.72440 | 1.39306E-02 | 1.04400E-02 | -1.88832E-01 | 5.08859E-01 | -6.36340E-01 | 4.14109E-01 | -1.04011E-01 | |
| S8 | -2.94543 | -2.04538E-01 | 2.62267E-01 | -3.17864E-01 | 3.57659E-01 | -2.98048E-01 | 1.43267E-01 | -2.76139E-02 | |
| S9 | -99.00000 | 1.04203E-01 | -3.85551E-01 | 5.06858E-01 | -5.62038E-01 | 4.60405E-01 | -2.52910E-01 | 7.80818E-02 | -9.83857E-03 |
| S10 | -57.62031 | 4.98734E-01 | -8.06496E-01 | 6.37983E-01 | -3.05330E-01 | 8.00121E-02 | -7.36112E-03 | -9.10342E-04 | 1.72831E-04 |
| S11 | -57.62031 | -1.56211E-02 | -1.00315E-01 | 8.79757E-02 | -3.38949E-02 | 7.45616E-03 | -9.79072E-04 | 7.17787E-05 | -2.25935E-06 |
| S12 | -5.36189 | -1.22279E-01 | 7.21947E-02 | -3.45279E-02 | 1.24977E-02 | -3.12810E-03 | 4.87408E-04 | -4.16018E-05 | 1.47324E-06 |

FIG. 4

| SECOND EMBODIMENT ||||||
|---|---|---|---|---|---|
| f = 3.016 | | Θ = 45.14 | TTL = | | |
| SURFACE NO. | | RADIUS OF CURVATURE | THICKNESS /DISTANCE | REFRACTIVE INDEX | ABBE NUMBER | FOCAL LENGTH |
| S1 | FIRST LENS | 10.0400 | 0.2300 | 1.650 | 21.5 | -469.220 |
| S2 | | 9.6300 | 0.0310 | | | |
| S3 | SECOND LENS | 6.3800 | 0.6230 | 1.544 | 56.1 | 2.600 |
| S4 | | -1.7500 | 0.0300 | | | |
| S5 | THIRD LENS | 1.8700 | 0.2400 | 1.650 | 21.5 | -6.480 |
| S6 | | 1.2300 | 0.6870 | | | |
| S7 | FOURTH LENS | -2.1800 | 0.6640 | 1.544 | 56.1 | 1.970 |
| S8 | | -0.8000 | 0.0300 | | | |
| S9 | FIFTH LENS | -18.1100 | 0.3000 | 1.650 | 21.5 | -16.440 |
| S10 | | 26.2800 | 0.0400 | | | |
| S11 | SIX LENS | 6.7200 | 0.4300 | 1.535 | 55.7 | -2.130 |
| S12 | | 0.9500 | 0.3300 | | | |
| S13 | FILTER | infinity | 0.1100 | 1.520 | 64.2 | |
| S14 | | infinity | 0.6210 | | | |
| S15 | IMAGING PLANE | infinity | | | | |

FIG. 7

ASPHERICAL COEFFICIENT

| SURFACE NO. | K | A | B | C | D | E | F | G | H |
|---|---|---|---|---|---|---|---|---|---|
| S1 | -14.28939 | -1.56055E-01 | 5.15174E-03 | 2.55630E-01 | -6.70825E-01 | 1.14354E+00 | 1.02684E+00 | 2.74220E-01 | |
| S2 | -44.95340 | -2.25320E-01 | 2.07676E-01 | 5.19511E-01 | -1.44278E+00 | 2.37678E+00 | -2.55301E+00 | 1.08329E+00 | |
| S3 | -90.28413 | -8.50184E-02 | -3.76840E-02 | 9.04167E-01 | -1.92732E+00 | 1.66741E+00 | -2.86862E-01 | -5.02504E-01 | |
| S4 | 2.10169 | 8.13099E-02 | -1.75444E-01 | 3.58884E-01 | -2.81272E-01 | 4.77360E-02 | 9.28259E-02 | -3.32326E-02 | |
| S5 | -6.36048 | -4.93129E-02 | -8.41298E-02 | 2.17076E-01 | -1.20985E-01 | -3.52416E-02 | 7.01401E-02 | -2.36758E-02 | |
| S6 | -3.06646 | -6.59629E-02 | 9.83505E-02 | -1.98074E-01 | 4.19476E-01 | -4.71802E-01 | 2.69807E-01 | -6.18400E-02 | |
| S7 | -9.79782 | -6.14802E-02 | 4.08889E-02 | -3.92494E-02 | 1.37685E-01 | -1.20061E-01 | 4.21281E-02 | -6.21694E-03 | |
| S8 | -3.13437 | -4.45891E-02 | -2.97072E-01 | 7.45139E-01 | 8.99342E-01 | 6.34648E-01 | -2.30671E-01 | 3.27738E-02 | |
| S9 | 53.08051 | 8.14039E-02 | -4.22607E-01 | 8.18362E-01 | -8.82678E-01 | 5.57343E-01 | -2.05949E-01 | 4.10640E-02 | -3.39333E-03 |
| S10 | 55.38432 | -3.59727E-02 | -2.83696E-02 | 9.68605E-02 | -1.14811E-01 | 6.71823E-02 | -2.12864E-02 | 3.48811E-03 | -2.30850E-04 |
| S11 | -98.99998 | 5.92865E-02 | 9.52153E-03 | -1.17236E-02 | 1.19101E-02 | -5.03291E-03 | 1.07857E-03 | -1.19125E-04 | 5.35643E-06 |
| S12 | -5.89955 | -8.03445E-02 | 3.50581E-02 | -1.87438E-02 | 8.51582E-03 | -2.60885E-03 | 4.82861E-04 | -4.83569E-05 | 2.00210E-06 |

FIG. 8

| THIRD EMBODIMENT ||||||
|---|---|---|---|---|---|
| f = | 2.976 | θ = | 45.26 | TTL = | 4.3420 |

| SURFACE NO. | | RADIUS OF CURVATURE | THICKNESS /DISTANCE | REFRACTIVE INDEX | ABBE NUMBER | FOCAL LENGTH |
|---|---|---|---|---|---|---|
| S1 | FIRST LENS | 4.6700 | 0.2220 | 1.635 | 23.9 | -33.040 |
| S2 | | 3.7500 | 0.0340 | | | |
| S3 | SECOND LENS | 5.0100 | 0.5790 | 1.544 | 56.1 | 2.400 |
| S4 | | -1.7000 | 0.0300 | | | |
| S5 | THIRD LENS | 1.7400 | 0.2190 | 1.650 | 21.5 | -6.900 |
| S6 | | 1.1900 | 0.6450 | | | |
| S7 | FOURTH LENS | -2.4000 | 0.7530 | 1.544 | 56.1 | 1.890 |
| S8 | | -0.8000 | 0.0300 | | | |
| S9 | FIFTH LENS | -13.2100 | 0.2980 | 1.650 | 21.5 | -141.010 |
| S10 | | -15.5700 | 0.0390 | | | |
| S11 | SIX LENS | -15.9900 | 0.4330 | 1.535 | 55.7 | -1.770 |
| S12 | | 1.0100 | 0.3290 | | | |
| S13 | FILTER | infinity | 0.1100 | 1.520 | 64.2 | |
| S14 | | infinity | 0.6210 | | | |
| S15 | IMAGING PLANE | infinity | | | | |

FIG. 11

ASPHERICAL COEFFICIENT

| SURFACE NO. | K | A | B | C | D | E | F | G | H |
|---|---|---|---|---|---|---|---|---|---|
| S1 | -16.65747 | -1.97416E-01 | 2.82890E-01 | -1.97890E+00 | 7.59938E+00 | -1.53378E+01 | 1.58986E+01 | -6.77866E+00 | |
| S2 | -46.12308 | -1.91915E-01 | 2.39678E-01 | -2.73403E-01 | 1.58090E+01 | -3.66285E+01 | 3.97716E+01 | -1.73318E+01 | |
| S3 | -88.87557 | -8.63702E-02 | 4.93601E-02 | -5.23862E-01 | 2.56871E+01 | -5.81368E+01 | 6.38345E+01 | -2.83048E+01 | |
| S4 | 2.15639 | 6.81129E-02 | -5.01479E-02 | 1.72973E-01 | -2.85804E-01 | 3.54744E-01 | -1.45092E-01 | -2.00608E-02 | |
| S5 | -7.51739 | 6.89568E-02 | 1.00271E-01 | -2.84740E-01 | 5.35519E-01 | -5.59442E-01 | 3.04133E-01 | -7.07616E-02 | |
| S6 | -3.26159 | -8.97940E-02 | 1.98940E-01 | -3.44096E-01 | 4.67770E-01 | -4.00543E-01 | 1.94357E-01 | -3.96136E-02 | |
| S7 | -8.85889 | -7.21863E-02 | 1.29813E-01 | -3.82551E-01 | 7.60258E-01 | -8.87169E-01 | 3.00172E-01 | -5.41234E-02 | |
| S8 | -3.15053 | -1.33458E-01 | 3.45111E-01 | 8.99930E-02 | -2.12231E-01 | 2.44403E-01 | -1.16629E-01 | 1.91833E-02 | |
| S9 | 47.59718 | -8.82944E-02 | 1.22167E-01 | -2.33175E-01 | 2.66705E-01 | -1.64948E-01 | 5.55447E-02 | -9.63887E-03 | 6.76759E-04 |
| S10 | 57.80480 | -8.33335E-02 | 1.48143E-01 | -2.30503E-01 | 2.07133E-01 | -1.06348E-01 | 3.11886E-02 | -4.88952E-03 | 3.20438E-04 |
| S11 | 51.29188 | -2.07878E-02 | -5.07402E-02 | 6.85211E-02 | -5.07810E-02 | 2.30263E-02 | -6.05245E-03 | 8.33607E-04 | -4.64014E-05 |
| S12 | -6.28593 | -8.04631E-02 | 4.21711E-02 | -1.75446E-02 | 4.87445E-03 | -9.46941E-04 | 1.29331E-04 | -1.11719E-05 | 4.42380E-07 |

FIG. 12

OPTICAL IMAGING SYSTEM

CROSS-REFERENCE TO RELATED APPLICATIONS

This application is a continuation of U.S. patent application Ser. No. 17/881,014 filed on Aug. 4, 2022, now U.S. Pat. No. 11,885,941 issued on Jan. 30, 2024, which is a continuation of U.S. patent application Ser. No. 16/779,998 filed on Feb. 3, 2020, now U.S. Pat. No. 11,442,252 issued on Sep. 13, 2022, which is a continuation of U.S. patent application Ser. No. 16/040,820 filed on Jul. 20, 2018, now U.S. Pat. No. 10,591,703 issued on Mar. 17, 2020, which is a continuation of U.S. patent application Ser. No. 15/190,654 filed on Jun. 23, 2016, now U.S. Pat. No. 10,054,768 issued on Aug. 21, 2018, which claims the benefit under 35 USC § 119 of Korean Patent Application No. 10-2015-0187172 filed on Dec. 28, 2015, in the Korean Intellectual Property Office, the entire disclosures of which are incorporated herein by reference for all purposes.

BACKGROUND

1. Field

The following description relates to an optical imaging system including lenses.

2. Description of Related Art

A plurality of optical imaging systems are mounted in a portable terminal, such as a camera, a mobile device, or a tablet. For example, the optical imaging systems are mounted on each of a front surface and a rear surface of the portable terminal.

The optical imaging system mounted on the rear surface of the portable terminal is used to photograph a subject positioned at a far distance from the portable terminal. Conversely, the optical imaging system mounted on the front surface of the portable terminal is used to photograph a subject positioned at a near distance from the portable terminal. In particular, the optical imaging system mounted on the front surface of the portable terminal generates an optical distortion phenomenon such as a barrel distortion. Therefore, there is a need to develop an optical imaging system capable of reducing the optical distortion phenomenon appropriate to photograph a subject at a short distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: a first lens including a negative refractive power and a convex object-side surface; a second lens including a convex object-side surface and a convex image-side surface; a third lens including a negative refractive power and a convex object-side surface; a fourth lens including a convex image-side surface; a fifth lens; and a sixth lens including an inflection point formed on an image-side surface thereof, wherein the first to sixth lenses are sequentially disposed in an optical-axis direction.

An image-side surface of the first lens may be concave. An image-side surface of the third lens may be concave. The fourth lens may include a positive refractive power. The image-side surface of the sixth lens may be concave. $TL/2Y<0.76$ may be satisfied, in which TL may be a distance from the object-side surface of the first lens to an imaging plane, and 2Y may be a diagonal length of the imaging plane.

$-3.0\%<Dist1.0-Dist0.6<-1.0\%$ may be satisfied, in which Dist1.0 may be a distortion ratio at a maximum height of an imaging plane, and Dist0.6 may be a distortion ratio at a point corresponding to 60% of the maximum height of the imaging plane.

$0.5<f/f2<1.7$ may be satisfied, in which f may be an overall focal length of the optical imaging system, and f2 may be a focal length of the second lens.

$-0.7<f/f3<-0.2$ may be satisfied, in which f may be an overall focal length of the optical imaging system, and f3 may be a focal length of the third lens.

$0.9<\tan\theta$ may be satisfied, in which $\theta$ may be a half of a field of view of the optical imaging system.

$0.7<t1+t3+t5<0.9$ may be satisfied, in which t1 may be a thickness of an optical axis center of the first lens, t3 may be a thickness of an optical axis center of the third lens, and t5 may be a thickness of an optical axis center of the fifth lens.

$1.63<n1<1.67$ may be satisfied, in which n1 may be a refractive index of the first lens.

$41.0<V1+V3<46.0$ may be satisfied, in which V1 may be an Abbe number of the first lens, and V3 may be an Abbe number of the third lens.

$f/EPD<2.1$ may be satisfied, in which f may be an overall focal length of the optical imaging system, and EPD may be an entrance pupil diameter of the optical imaging system.

$-4.5<R21/R22<-1.3$ may be satisfied, in which R21 may be a radius of curvature of an object-side surface of the second lens, and R22 may be a radius of curvature of an image-side surface of the second lens.

In accordance with a further embodiment, there is provided an optical imaging system, including: a first lens including a negative refractive power and a convex object-side surface; a second lens; a third lens including a convex object-side surface; a fourth lens including a positive refractive power and a concave object-side surface; a fifth lens; and a sixth lens including an inflection point formed on an image-side surface thereof, wherein the first to sixth lenses are sequentially disposed in an optical-axis direction.

In accordance with an embodiment, there is provided an optical imaging system, including: first lens; a second lens including, in a paraxial region, a concave object-side surface and a concave image-side surface; a third lens; a fourth lens; a fifth lens including, in the paraxial region, at least one of a convex object-side surface and a convex image-side surface; and a sixth lens including, in the paraxial region, a convex object-side surface and a concave image-side surface.

The first lens may include a negative refractive power, the second lens may include a positive refractive power, the third lens may include a negative refractive power, the fourth lens may include a positive refractive power, the fifth lens may include a positive refractive power, and the sixth lens may include a negative refractive power.

The third lens may include, in the paraxial region, a convex object-side surface and a concave image-side surface.

The fourth lens may include, in the paraxial region, a concave object-side surface and a convex image-side surface.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of lenses of the optical imaging system illustrated in FIG. 1;

FIG. 4 is a table representing aspherical characteristics of the optical imaging system illustrated in FIG. 1;

FIG. 7 is a table representing characteristics of lenses of the optical imaging system illustrated in FIG. 5;

FIG. 8 is a table representing aspherical characteristics of the optical imaging system illustrated in FIG. 5.

FIG. 11 is a table representing characteristics of lenses of the optical imaging system illustrated in FIG. 9; and FIG. 12 is a table representing aspherical characteristics of the optical imaging system illustrated in FIG. 9.

Figure 1:
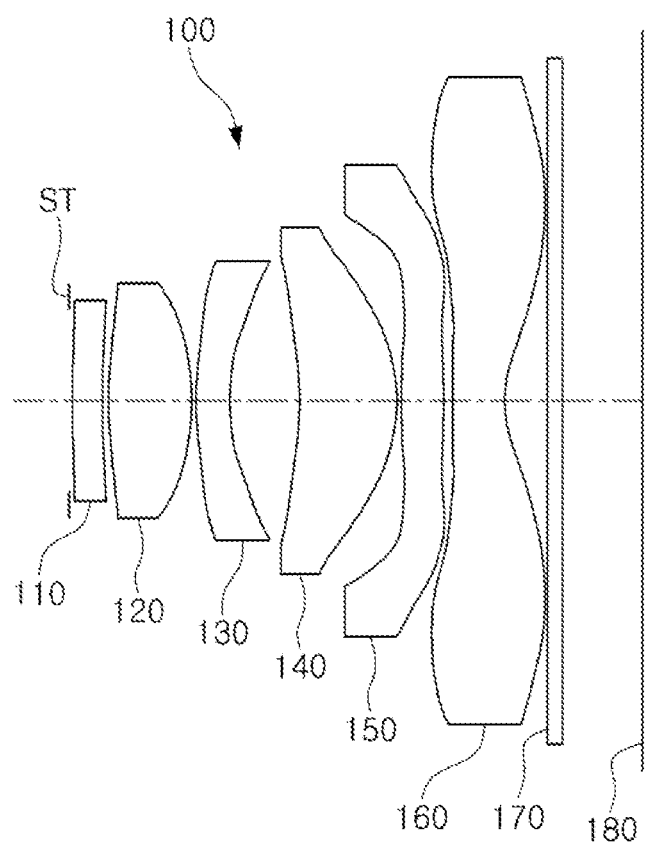
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Hereinafter, various embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be formed by one or a combination thereof.

In addition, in accordance with an embodiment, a first lens refers to a lens closest to an object or a subject from which an image is captured. A sixth lens is a lens closest to an imaging plane or an image sensor. In addition, all of radii of curvature and thicknesses of lenses, an OAL, an Img HT (½ of a diagonal length of the imaging plane), and focal lengths are indicated in millimeters (mm).

A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

Further, concerning shapes of the lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

The first lens may have refractive power. For example, the first lens may have a negative refractive power.

At least one surface of the first lens may be convex. For example, an object-side surface of the first lens is convex.

The first lens may have an aspherical surface. For example, both surfaces of the first lens is aspherical. The first lens may be formed of a material having high light transmissivity and excellent workability. For example, the first lens may be formed of plastic or a polyurethane material. However, a material of the first lens is not limited to plastic. For example, the first lens may be formed of glass.

The second lens may have refractive power. For example, the second lens has a positive refractive power.

At least one surface of the second lens may be convex. For example, an object-side surface of the second lens is convex.

The second lens may have an aspherical surface. For example, an object-side surface of the second lens is aspherical. The second lens may be formed of a material having high light transmissivity and excellent workability. For example, the second lens may be formed of plastic or a polyurethane material. However, a material of the second lens is not limited to plastic. For example, the second lens may be formed of glass.

The third lens may have refractive power. For example, the third lens has a negative refractive power.

At least one surface of the third lens may be convex. For example, an object-side surface of the third lens is convex.

The third lens may have an aspherical surface. For example, an image-side surface of the third lens is aspherical. The third lens may be formed of a material having high light transmissivity and excellent workability. For example, the third lens may be formed of plastic or a polyurethane material. However, a material of the third lens is not limited to plastic. For example, the third lens may be formed of glass.

The fourth lens may have refractive power. For example, the fourth lens has a positive refractive power.

One surface of the fourth lens may be convex. For example, an image-side surface of the fourth lens is convex.

The fourth lens may have an aspherical surface. For example, both surfaces of the fourth lens is aspherical. The fourth lens is formed of a material having high light transmissivity and excellent workability. For example, the fourth lens may be formed of plastic or a polyurethane material. However, a material of the fourth lens is not limited to plastic. For example, the fourth lens may be formed of glass.

The fifth lens may have refractive power. For example, the fifth lens has a positive or a negative refractive power.

The fifth lens may have an aspherical surface. For example, both surfaces of the fifth lens are aspherical. In another example, the object-side surface of the fifth lens is convex in a paraxial region and the image-side surface of the fifth lens is flat or substantially flat in a paraxial region and gradually curves, in a convex shape, at edge portions thereof.

The fifth lens may be formed of a material having high light transmissivity and excellent workability. For example, the fifth lens may be formed of plastic. However, a material of the fifth lens is not limited to plastic or a polyurethane material. For example, the fifth lens may be formed of glass.

The sixth lens may have refractive power. For example, the sixth lens has a negative refractive power.

The sixth lens may have a meniscus shape. For example, an image-side surface of the sixth lens is concave. In another example, the object-side surface of the sixth lens is flat or substantially flat in a paraxial region and the image-side surface of the sixth lens is concave in a paraxial region.

The sixth lens may have inflection points. For example, the inflection points are formed on both surfaces of the sixth lens.

The sixth lens may have an aspherical surface. For example, both surfaces of the sixth lens are aspherical. The sixth lens may be formed of a material having high light transmissivity and excellent workability. For example, the sixth lens may be formed of plastic or a polyurethane material. However, a material of the sixth lens is not limited to plastic. For example, the sixth lens may be formed of glass.

In an embodiment, the image-side surface of the sixth lens is concave in a paraxial region and gradually curves to be convex towards edge portions thereof.

A person of ordinary skill in the relevant art will appreciate that each of the first through sixth lenses may be configured in an opposite refractive power from the configuration described above. For example, in an alternative configuration, the first lens has a positive refractive power, the second lens has a negative refractive power, the third lens has a positive refractive power, the fourth lens has a negative refractive power, the fifth lens has a positive or a negative refractive power, and the sixth lens has a positive refractive power.

At least one of the first to sixth lenses may have an aspherical shape. As an example, only the sixth lens of the first to sixth lenses has the aspherical surface shape. In addition, at least one surface of all of the first to sixth lenses may be aspherical. In an example, an aspherical surface of each lens may be represented by the following Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{[Equation 1]}$$

In an example, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

The filter filters a partial wavelength from incident light incident through the first to sixth lenses. For example, the filter filters an infrared wavelength of the incident light.

The filter may be manufactured at a reduced thickness. To this end, the filter may be formed of plastic or a polyurethane material.

The image sensor is configured to realize high resolution. For example, a unit size of pixels configuring the image sensor is 1.12 µm or less. The image sensor may form the imaging plane.

The stop is disposed in order to adjust an amount of light incident to the lenses. For example, the stop may be disposed adjacently to the object-side surface of the first lens.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

The optical imaging system satisfies the following Conditional Expressions 1 through 10:

$TL/2Y<0.76$ [Conditional Expression 1]

$-3.0<Dist1.0-Dist0.6<-1.0$ [Conditional Expression 2]

$0.5<f/f2<1.7$ [Conditional Expression 3]

$-0.7<f/f3<-0.2$ [Conditional Expression 4]

$0.9<\tan\theta$ [Conditional Expression 5]

$0.7<t1+t3+t5<0.9$ [Conditional Expression 6]

$1.63<n1<1.67$ [Conditional Expression 7]

$41.0<V1+V3<46.0$ [Conditional Expression 8]

$f/EPD<2.1$ [Conditional Expression 9]

$-4.5<R21/R22<-1.3.$ [Conditional Expression 10]

In one example, TL is a distance from the object-side surface of the first lens to the imaging plane, 2Y is a diagonal length of the imaging plane, Dist1.0 is a distortion ratio at a maximum height of the imaging plane, Dist0.6 is a distortion ratio at a point corresponding to 60% of the maximum height of the imaging plane, f is an overall focal length of the optical imaging system, f2 is a focal length of the second lens, f3 is a focal length of the third lens, θ is a half of a field of view of the optical imaging system, t1 is a thickness of an optical axis center of the first lens, t3 is a thickness of an optical axis center of the third lens, t5 is a thickness of an optical axis center of the fifth lens, n1 is a refractive index of the first lens, V1 is an Abbe number of the first lens, V3 is an Abbe number of the third lens, EPD is an entrance pupil diameter, R21 is a radius of curvature of the object-side surface of the second lens, and R22 is a radius of curvature of an image-side surface of the second lens.

The optical imaging system satisfying the above Conditional Expressions 1 through 10 may be miniaturized, and may realize high resolution. In addition, the optical imaging system satisfying the above Conditional Expressions may significantly reduce an optical distortion phenomenon. Further, the optical imaging system satisfying the above Conditional Expressions may realize a field of view (θ*2) of 90 degrees or more.

Next, optical imaging systems, according to various embodiments, will be described.

An optical imaging system, according to a first embodiment, will be described with reference to FIG. 1.

The optical imaging system 100, according to the first embodiment, includes an optical system including a first lens 110, a second lens 120, a third lens 130, a fourth lens 140, a fifth lens 150, and a sixth lens 160.

The optical imaging system 100 includes a filter 170, an image sensor 180, and a stop ST. The filter 170 is disposed between the sixth lens 160 and the image sensor 180, and the stop ST is disposed adjacently to an object-side surface of the first lens 110.

In accordance with one example, the object-side surfaces and the image-side surfaces to be described below with respect to each of the first through sixth lenses 110 through 160 are described with respect to the paraxial regions. For instance, for the first lens 110, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 1 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 1.

In an embodiment, the first lens 110 has a negative refractive power, and an object-side surface thereof is convex and an image-side surface thereof is concave. The second lens 120 has a positive refractive power, and both surfaces thereof are convex. The third lens 130 has a negative refractive power, and an object-side surface thereof is convex and an image-side surface thereof is concave. The fourth lens 140 has a positive refractive power, and an object-side surface thereof is concave and an image-side surface thereof is convex. The fifth lens 150 has a positive refractive power, and an object-side surface thereof is convex and an image-side surface thereof is convex. The sixth lens 160 has a negative refractive power, and an object-side surface thereof is convex and an image-side surface thereof is concave. In addition, inflection points are formed on both surfaces of the sixth lens 160.

Figure 2:
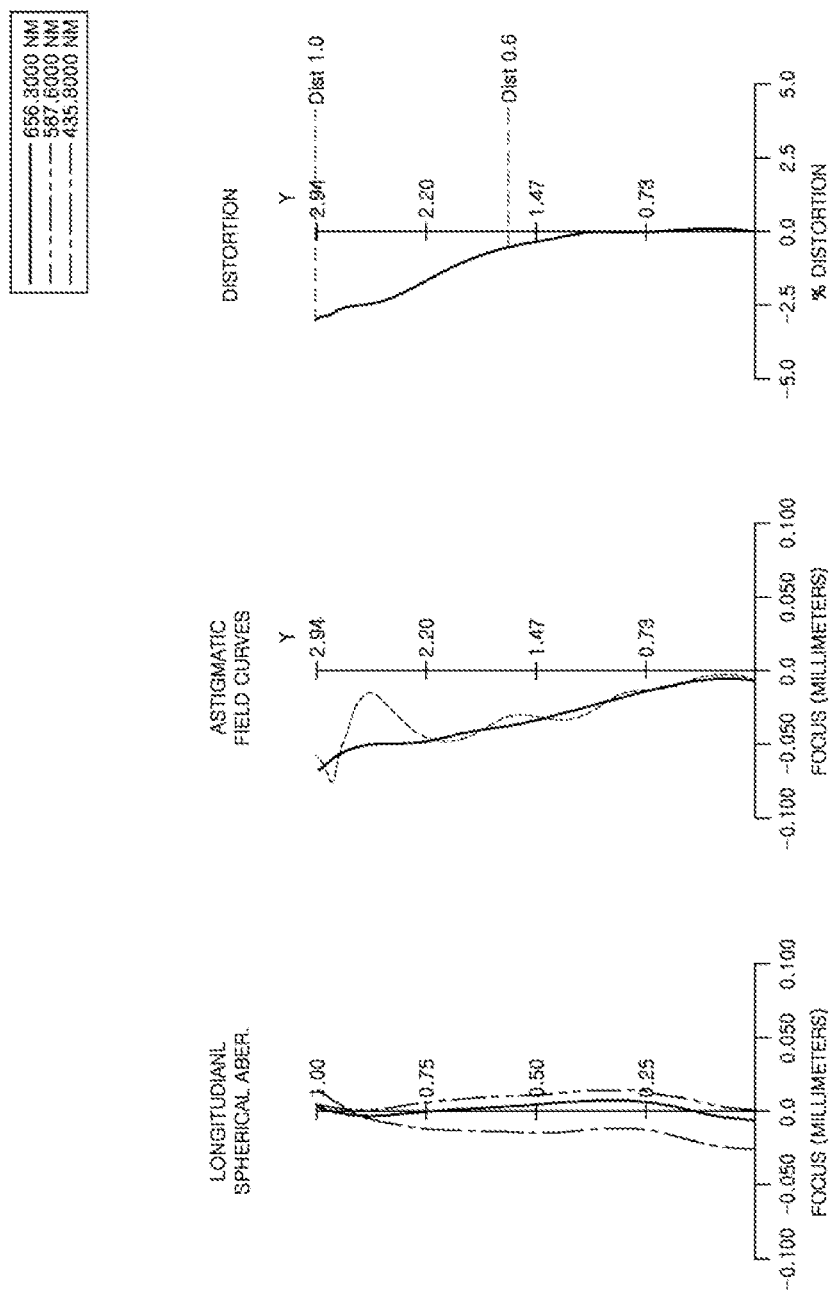
FIG. 2 are graphs representing aberration curves of the optical imaging system illustrated in FIG. 1.

The optical imaging system configured as described above may represent aberration characteristics as illustrated in FIG. 2. FIGS. 3 and 4 are tables representing characteristics of lenses and aspherical characteristics of the optical imaging system, according to the first embodiment.

Figure 5:
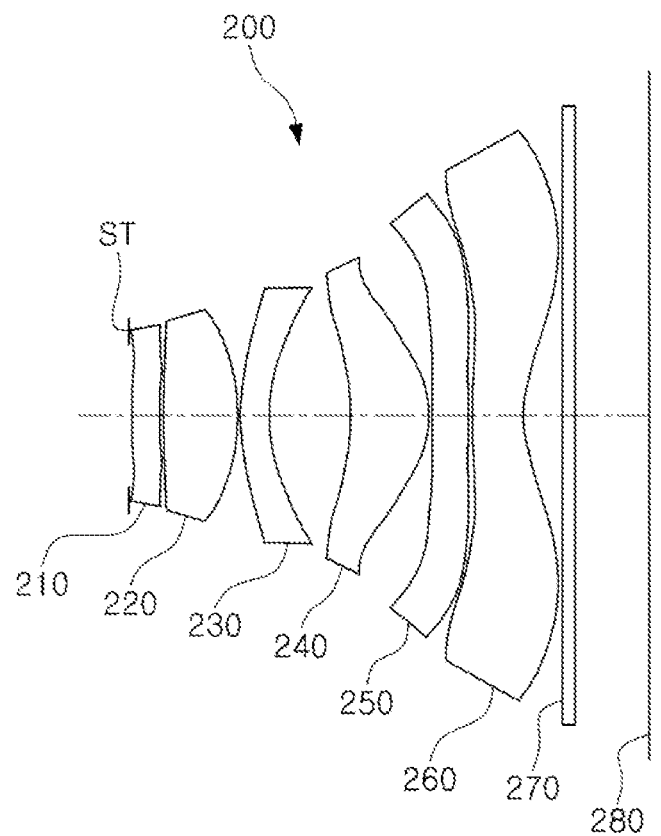
FIG. 5 is a view of an optical imaging system, according to a second embodiment.

An optical imaging system, according to a second embodiment, will be described with reference to FIG. 5.

The optical imaging system 200, according to the second embodiment, includes an optical system including a first lens 210, a second lens 220, a third lens 230, a fourth lens 240, a fifth lens 250, and a sixth lens 260.

In accordance with an example, the object-side surfaces and the image-side surfaces to be described below with respect to each of the first through sixth lenses 210 through 260 are described with respect to the paraxial regions. For instance, for the first lens 210, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 5 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 5.

The optical imaging system 200 includes a filter 270, an image sensor 280, and a stop ST. The filter 270 is disposed between the sixth lens 260 and the image sensor 280, and the stop ST is disposed adjacently to an object-side surface of the first lens 210.

In an embodiment, the first lens 210 has a negative refractive power, and an object-side surface thereof is convex and an image-side surface thereof is concave. The second lens 220 has a positive refractive power, and both surfaces thereof are convex. The third lens 230 has a negative refractive power, and an object-side surface thereof is convex and an image-side surface thereof is concave. The fourth lens 240 has a positive refractive power, and an object-side surface thereof is concave and an image-side surface thereof is convex. The fifth lens 250 has a negative refractive power, and an object-side surface thereof is concave and an image-side surface thereof is concave. The sixth lens 260 has a negative refractive power, and an object-side surface thereof is convex and an image-side surface thereof is concave. In addition, inflection points are formed on both surfaces of the sixth lens 260.

Figure 6:
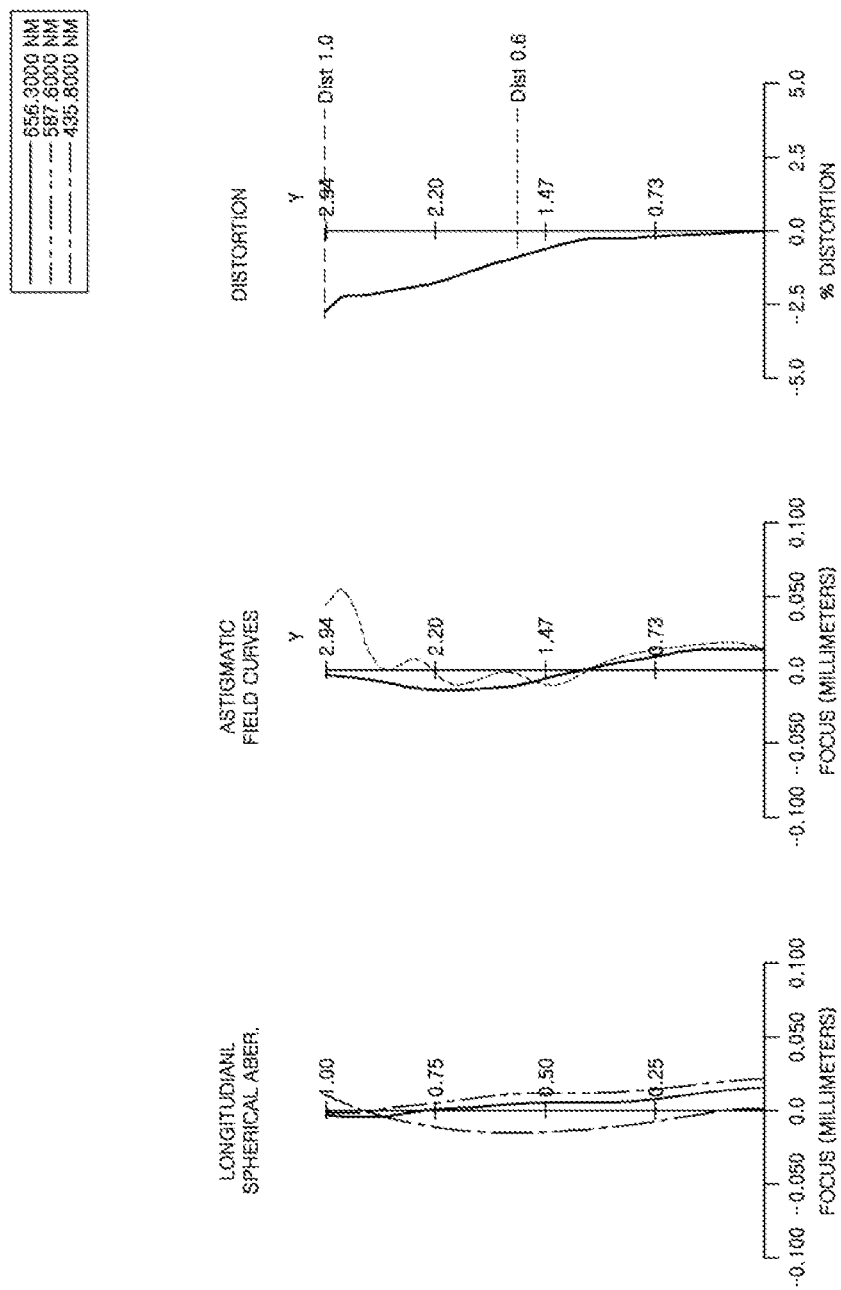
FIG. 6 are graphs representing aberration curves of the optical imaging system illustrated in FIG. 5.

The optical imaging system, configured as described above, represents aberration characteristics as illustrated in FIG. 6. FIGS. 7 and 8 are tables representing characteristics of lenses and aspherical characteristics of the optical imaging system, according to the second embodiment.

Figure 9:
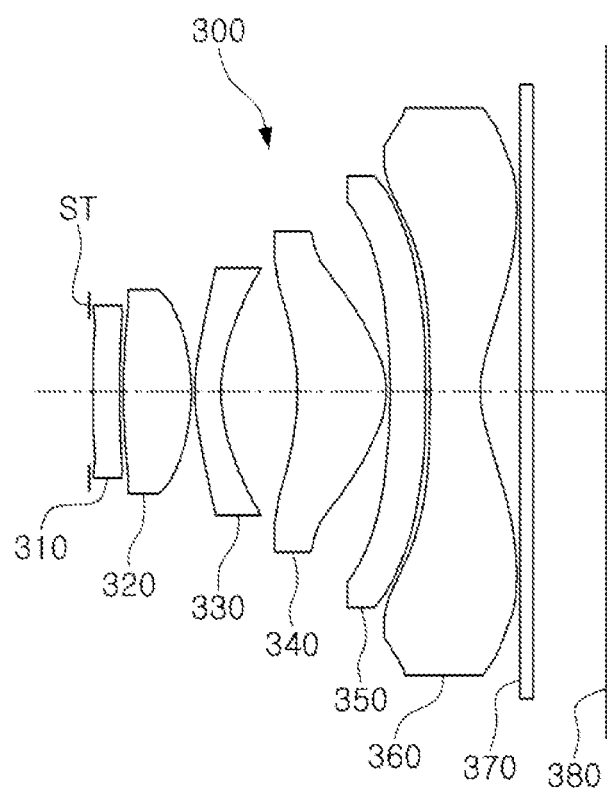
FIG. 9 is a view of an optical imaging system, according to a third embodiment.

An optical imaging system, according to a third embodiment, will be described with reference to FIG. 9.

The optical imaging system 300, according to the third embodiment, includes an optical system including a first lens 310, a second lens 320, a third lens 330, a fourth lens 340, a fifth lens 350, and a sixth lens 360.

The optical imaging system 300 includes a filter 370, an image sensor 380, and a stop ST. The filter 370 is disposed between the sixth lens 360 and the image sensor 380, and the stop ST is disposed adjacently to an object-side surface of the first lens 310.

In accordance with an example, the object-side surfaces and the image-side surfaces to be described below with respect to each of the first through sixth lenses 310 through 360 are described with respect to the paraxial regions. For instance, for the first lens 310, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 9 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 9.

In an embodiment, the first lens 310 has a negative refractive power, and an object-side surface thereof is convex and an image-side surface thereof is concave. The second lens 320 has a positive refractive power, and both surfaces thereof are convex. The third lens 330 has a negative refractive power, and an object-side surface thereof is convex and an image-side surface thereof is concave. The fourth lens 340 has a positive refractive power, and an object-side surface thereof is concave and an image-side surface thereof is convex. The fifth lens 350 has a negative refractive power, and an object-side surface thereof is concave and an image-side surface thereof is convex. The sixth lens 360 has a negative refractive power, and an object-side surface thereof is concave and an image-side surface thereof is concave. In addition, inflection points are formed on both surfaces of the sixth lens 360.

Figure 10:
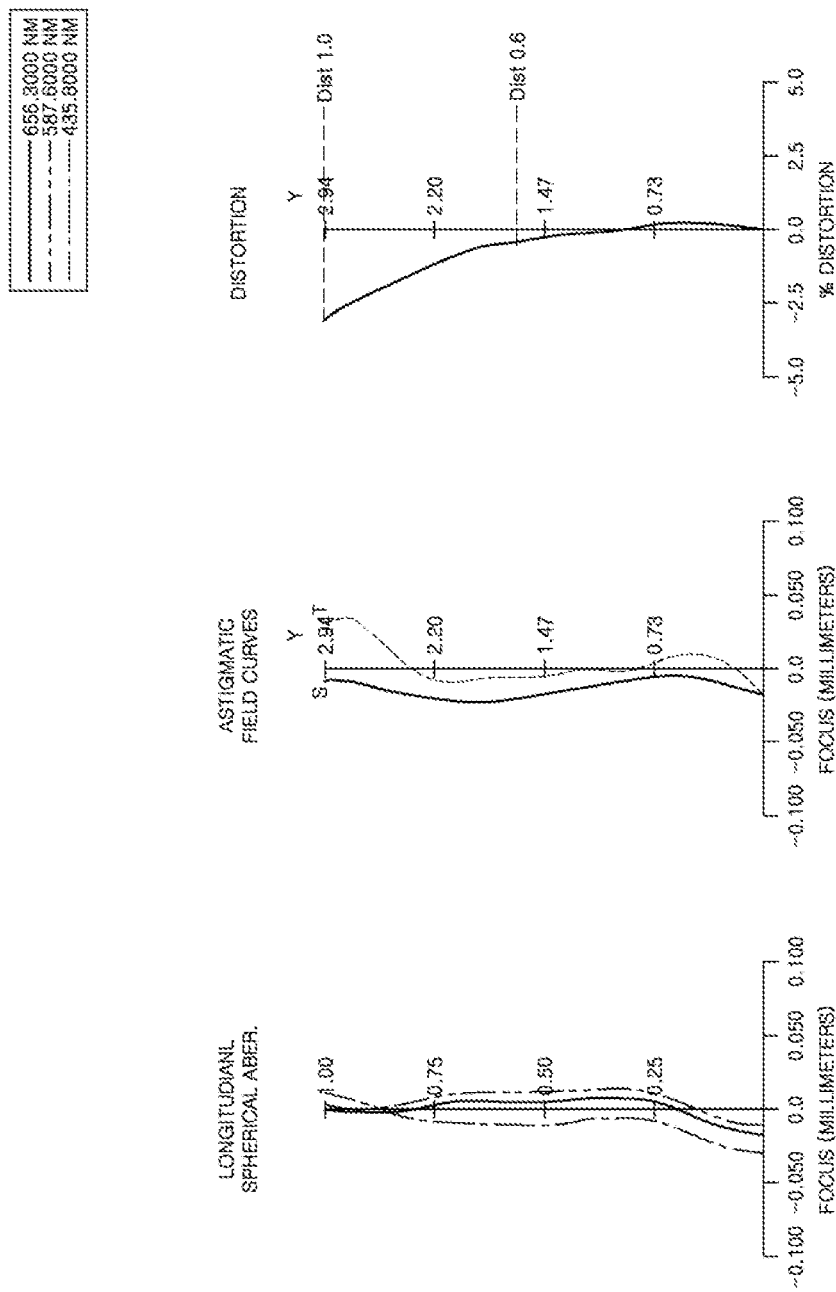
FIG. 10 are graphs representing aberration curves of the optical imaging system illustrated in FIG. 9.

The optical imaging system configured as described above represents aberration characteristics as illustrated in FIG. 10. FIGS. 11 and 12 are tables representing characteristics of lenses and aspherical characteristics of the optical imaging system, according to the third embodiment.

Table 1 represents values of Conditional Expressions 1 through 10 of the optical imaging systems, according to the first to third embodiments.

TABLE 1

| Conditional Expression | First Embodiment | Second Embodiment | Third Embodiment |
| --- | --- | --- | --- |
| TL/(2Y) | 0.744 | 0.744 | 0.740 |
| Dist1.0-Dist0.6 | −2.190 | −1.540 | −1.960 |
| f/f2 | 1.190 | 1.160 | 1.240 |
| f/f3 | −0.490 | −0.460 | −0.430 |
| tanθ | 1.003 | 1.005 | 1.009 |
| t1 + t3 + t5 | 0.810 | 0.770 | 0.740 |
| nd1 | 1.650 | 1.650 | 1.635 |
| vd1 + vd3 | 43.04 | 43.04 | 45.42 |
| f/EPD | 2.020 | 2.084 | 2.058 |
| R21/R22 | −1.962 | −3.641 | −2.949 |

As set forth above, according to an embodiment, the optical imaging system is capable of reducing an optical distortion phenomenon.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
 a first lens comprising negative refractive power;
 a second lens comprising a refractive power;
 a third lens comprising a convex object-side surface;
 a fourth lens comprising a refractive power;
 a fifth lens comprising a refractive power; and
 a sixth lens comprising negative refractive power and a convex object-side surface,
 wherein the first to sixth lenses are sequentially disposed in an optical-axis direction,
 wherein an absolute value of a radius of curvature of the object-side surface of the third lens is greater than an absolute value of a radius of curvature of an image-side surface of the second lens,
 wherein a thickness along an optical axis of the second lens is greater than a thickness along an optical axis of the sixth lens, and
 wherein the sixth lens has an inflection point formed on an object-side surface or an image-side surface of the sixth lens.

2. The optical imaging system of claim 1, wherein the first lens has a convex object-side surface.

3. The optical imaging system of claim 1, wherein the first lens has a concave image-side surface.

4. The optical imaging system of claim 1, wherein the second lens has a convex object-side surface.

5. The optical imaging system of claim 1, wherein the third lens has a concave image-side surface.

6. The optical imaging system of claim 1, wherein the fifth lens has a convex object-side surface.

7. The optical imaging system of claim 1, wherein the fifth lens has a convex image-side surface.

8. The optical imaging system of claim 1, wherein the sixth lens has a concave image-side surface.

9. An optical imaging system, comprising:
a first lens comprising a refractive power;
a second lens comprising a refractive power;
a third lens comprising negative refractive power and a convex object-side surface;
a fourth lens comprising a refractive power;
a fifth lens comprising a refractive power; and
a sixth lens comprising negative refractive power,
wherein the first to sixth lenses are sequentially disposed in an optical-axis direction,
wherein an absolute value of a radius of curvature of the object-side surface of the third lens is greater than an absolute value of a radius of curvature of an image-side surface of the second lens,
wherein a thickness along an optical axis of the fourth lens is greater than a thickness along an optical axis of the second lens, and
wherein the sixth lens has an inflection point formed on an object-side surface or an image-side surface of the sixth lens.

10. The optical imaging system of claim 9, wherein the first lens has a convex object-side surface.

11. The optical imaging system of claim 9, wherein the first lens has a concave image-side surface.

12. The optical imaging system of claim 9, wherein the second lens has a convex object-side surface.

13. The optical imaging system of claim 9, wherein the third lens has a concave image-side surface.

14. The optical imaging system of claim 9, wherein the fifth lens has a convex object-side surface.

15. The optical imaging system of claim 9, wherein the fifth lens has a convex image-side surface.

16. The optical imaging system of claim 9, wherein the sixth lens has a concave image-side surface.

* * * * *